Figure 1:
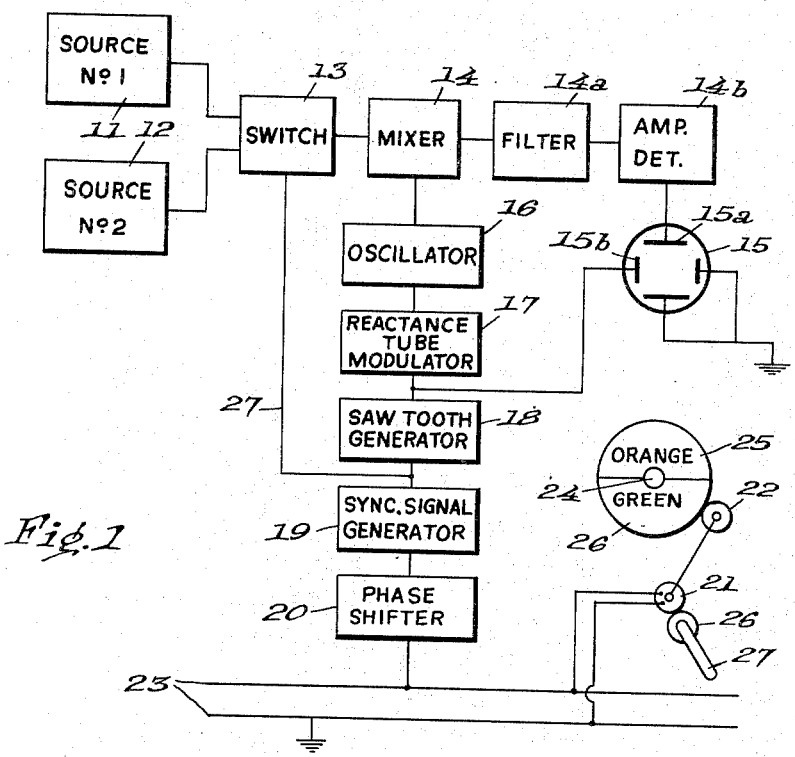

Oct. 10, 1950          J. I. HELLER          2,525,675

SIGNAL COMPARING SYSTEM

Filed May 7, 1946

Inventor
Joseph I. Heller,
By Hyman Hurvitz
his Attorney

Patented Oct. 10, 1950

2,525,675

UNITED STATES PATENT OFFICE 2,525,675

SIGNAL COMPARING SYSTEM

Joseph I. Heller, Brooklyn, N. Y., assignor to Panoramic Radio Corporation, New York, N. Y., a corporation of New York Application May 7, 1946, Serial No. 667,849

9 Claims. (Cl. 175—183)

This invention relates generally to cathode ray indicator systems for displaying simultaneously on a single screen a plurality of discrete indications, and relates particularly to systems of the above character wherein the discrete indications may be individually identified by associating with each discrete indication a distinctive color.

One application of cathode ray indicators is to enable visual comparison of two or more discrete traces or wave shapes. In the prior art this has been accomplished by applying the signals giving rise to the traces sequentially to the indicator by means of electronic or mechanical switches, the switch being operated preferably at a speed above that usually associated with the persistence of vision. Satisfactory results may be obtained by this method so long as the wave shapes being compared are not superposed or closely adjacent over any considerable portions of their length, and so long as the exact point of cross over between traces is not especially important. Should such conditions be faced, however, precise comparison of traces becomes difficult because of the occurrence of the phenomenon of halation. It is also true that, should the respective traces be complex in character or discontinuous, it may be extremely difficult to determine with which of a plurality of waves any given trace segment is properly associable.

In order to avoid the many difficulties inherent in the prior art devices, and some of which have been above described, I propose to associate with each of a plurality of traces on the face of a cathode ray indicator, a distinctive color. In the practice of my novel system I apply a series of discrete electrical waves to a cathode ray indicator sequentially, and synchronously place before the screen of the cathode ray tube indicator a series of colored viewing screens, each of which passes light rays of a different distinctive color. In this manner I am enabled to view the traces produced by each of the electrical waves as a distinctively colored trace, whereby confusion between traces is completely eliminated.

It is, accordingly, an object of this invention to provide a cathode ray indicator system wherein each of a series of signals may be applied in sequence to the indicator, and wherein each of the resultant traces on the face of the indicator may be viewed through a distinctively colored screen.

It is a further object of the invention to provide a method for comparing separate traces on the face of a cathode ray indicator by associating each trace with a distinctive color.

It is another object of the invention to enable accurate determination of cross over points and lines of substantial or approximate superposition in cathode ray tube systems.

It is still a further object of the invention to provide a comparison method for comparing the frequency characteristics of electric circuit elements or combinations of such elements, accurately, certainly and rapidly, and without the possibility of introducing errors due to halation or similar effects.

I have described my novel system as applied to the comparison or the discrete presentation of two wave forms, not intending, nevertheless, to be limited in respect to the number of discrete traces compared or presented, since by obvious extensions of my system a greater number than two signals may be applied sequentially to a cathode ray indicator and differentiated in terms of distinct colors associated with the various traces.

While I have described one specific embodiment of my invention and one specific mode of applying same, it will be obvious that various modifications of the invention may be made, both in respect to the arrangement of the elements and the choice of elementary components of the combination, and that many possible uses and applications therefor are readily possible.

Figure 2:
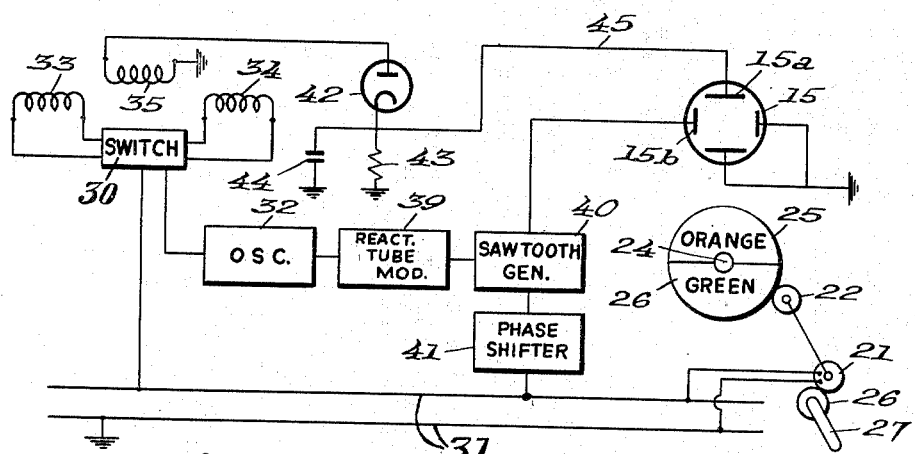

Further objects and advantages of my invention will become apparent upon study of the following detailed description of an embodiment thereof, when taken in conjunction with the accompanying drawings, wherein:

Figure 1 is a block circuit diagram, illustrating schematically an embodiment of the invention; and Figure 2 is a block circuit diagram of a further embodiment of the invention, illustrating particularly one mode of application thereof.

Referring now to the drawings and particularly to Figure 1 thereof, the numeral 11 denotes one source of electrical signals, and the numeral 12 another such source, which are coupled to a switch 13. It is assumed that the source #1 and the source #2 each provide a complex wave form comprising frequencies within a given band of frequencies, it being desired to display the frequency characteristics associated with each of sources #1 and #2 simultaneously on the face of the cathode ray oscilloscope or indicator 15.

The switch 13 may be operated directly from power bus 23, and may be of any desired nature, provided only that its action may be synchronized with the voltage available at the bus 23. Electronic switches suitable for the desired application are well known in the art, as are also mechanical switches, examples of which are motor driven rotary or commutator type switches, driven by synchronous motors energized from the bus 23.

Signals derived from the switch 13, and which consist of signals derived sequentially from the sources 11 and 12 are applied to a mixer 14, to which is also applied the output of an oscillator 16. The resultant signal may be filtered to remove undesired combinatory components in the filter 14a and the filtered resultant may be amplified and detected in the circuit arrangement 14b, having a very narrow pass band, and the output thereof being applied to a vertical plate 15a of the indicator 15, the opposing vertical plate being grounded.

The oscillator 16 is frequency modulated by means of a reactance tube modulator 17, controlled in response to signals provided by a saw tooth generator 18, which is synchronized by means of a synchronizing circuit 19, capable of deriving sync signals from a sine signal provided at the output of a phase shifter 20, which itself derives voltage from the bus 23. The output of the sync signal generator 19 is further applied over lead 27 to the switch 13 where it serves to synchronize the operation thereof with the operation of the other elements of the system.

The reactance tube modulator 17 causes a frequency sweep of the oscillator 16 over a band of frequencies displaced from but of equal extent with those made available at the output of the switch 13, and in view of the narrow band characteristic of the amplifier and detector 14b, and by a proper choice of the tuned frequency of the circuit device 14b, as well as of the center frequency of the oscillator 16, in relation to the band of frequencies under examination, the amplitudes of the signal components present in each of sources 11 and 12 are sequentially applied to the plate 15, to provide deflections of the cathode ray beam.

The voltage of the saw tooth generator 18 may be applied to the horizontal plate 15b of the indicator 15 to provide a deflection thereof at all times proportional to the frequency deviation of the oscillator 16.

Driven from the bus 23 is an electric motor 21, of the synchronous type, the rate of rotation of which is synchronized with the switching rate of the switch 13, by virtue of the common connection to the bus 23. The motor 21 drives a pinion 22 which serves to rotate a color wheel 24, one half of which, denoted by the numeral 25, is orange and the other half of which, 26, is green in color.

Since, in general, the phase of the rotary movement of a synchronous motor is random I supply a pinion 26 having a manual actuating means 27 for moving the frame of the motor 21 to bring its motion into phase with the action of the switch 13. Once the motor 21 and the switch 13 are synchronized and in phase, the orange and green screens, numbered 25 and 26 respectively, may be interposed between the eye of an observer and the face of the oscilloscope 15, at precisely those times when the signals from the respective sources 11 and 12 appear thereon, the orange screen 25 being associated with source 12, or vice versa as desired.

The switch 13 may be arranged to operate to pass signals from the source 11 for a complete cycle of the alternating voltages provided by the bus 23, and to pass signals deriving from the source 12 for a succeeding full cycle, the sync signal generator 19 in such case being arranged to provide one synchronizing pulse for each full cycle of alternating voltage provided by the bus 23. Adjustment of the phase shifter 20 enables accurate phasing of the sweep of the oscillator 16 with respect to the action of the switch 13 and the color wheel 24. In accordance with the embodiment of my invention as illustrated schematically in Figure 1 of the drawings, and as described in detail hereinbefore, discrete traces will be provided on the face of the indicator 15, each trace representing the frequency characteristic of the signals associated with the sources 11 and 12, and each trace being visible in its own distinctive coloration, cross over points between traces being clearly identifiable in a color resulting from the combination of green and orange, which in the present instance is yellow.

Reference is now made to Figure 2 of the drawings wherein is illustrated a further embodiment of my invention as applied to the testing of coils by comparison of the frequency characteristic of a coil to be tested, and denoted by the numeral 33, with the frequency characteristic of a standard coil 34.

The switch 30, in this embodiment of the invention, is utilized to apply a frequency modulated signal to the coils 33 and 34 sequentially, the switch being operated in desired cadence by means of voltages derived from the alternating current bus 31, the switch preferably serving to couple the coil 33 to an oscillator 32 for a complete cycle of signal derivable from bus 31 and to couple the coil 34 to the oscillator 32 during a succeeding cycle.

The oscillator 32 is frequency modulated by means of a reactance tube modulator 39, the reactance of which is controlled by a saw tooth generator 40 synchronized and energized by voltages derived from the bus 31, and providing one sweep cycle for each cycle of voltage provided by the bus 31. Interposed between the saw tooth generator 40 and the bus 31 is a phase shifter 41, adjustable manually in order to enable proper phasing of the action of the switch 30 and of the frequency deviations of the oscillator 32. The coils 33 and 34 are coupled by means of a pickup coil 35, to rectifier diode 42, connected to derive the envelope of signal voltages applied thereto in its output resistor 43, the latter being by-passed by capacitor 44, for the frequency of the oscillator 32. The resistor 43 is coupled over lead 45 to the vertical plate 15a of the cathode ray indicator 15, sweep voltage for the indicator 15 being provided by coupling the saw tooth generator 40 directly to the horizontal plate 15b, the position of the cathode ray of the indicator 15 being in this manner directly locked with the deviations of frequency of the oscillator 32.

A multicolored viewing screen 24 may be utilized to enable discrimination between a trace representing the frequency characteristic of the coil 33, and a trace representative of the frequency characteristic of the coil 34. The structure and operation of the screen and its drive mechanism having been described in detail in connection with the description of the embodiment of the invention illustrated in Figure 1 of the drawings, requires no further discussion here.

It will be clear that while I have illustrated and described the embodiment of my invention which is illustrated in Figure 2 of the drawings as applied to the comparison of coil characteristics, that the invention may be applied likewise to testing the relative frequency responses of filters, condensers, tuned circuits and the like, with but minor modifications of the arrangement.

While I have described various specific embodiments of my invention, as illustrative thereof, it will be clear that modifications of the specific embodiments may be resorted to, both in respect to the arrangement of the combination and in the choice of elements, without departing from the spirit of the invention, as defined in the following claims.

What I claim and desire to secure by Letters Patent of the United States is:

1. A signal comparison system comprising a plurality of independent sources of signals to be compared; an oscilloscope having a display surface, and two sets of beam deflecting plates; means comprising a single channel for connecting the sources sequentially to one pair of deflecting plates; a motor; a multi-color filter screen actuable thereby in front of the display surface; and means including a source of synchronizing voltage to control the sequential connection of the signal sources to said pair of deflecting plates and to energize the motor so that the trace of each signal will be seen only through its corresponding color filter.

2. A system as in claim 1, in which the motor may be adjustably positioned, upon starting from rest, to position the color filter screen in desired phase relation with the signal traces.

3. A signal comparison system comprising a plurality of independent sources of signals to be compared; an oscilloscope having a display surface and two deflection means; means comprising a single channel for connecting the sources sequentially to one of the deflection means; means for controlling the timing of the sequential connections by controlling the connecting means; a motor; a multicolor filter in front of the display surface and driven by the motor so the display surface may be viewed through the filter; and a source of synchronizing voltage to control the energization of the timing means, the motion of the motor and the energization of a second of said deflection means to establish a time base on the display surface to permit comparison of the signals by the separately colored traces.

4. A signal comparison system for comparing the response of a plurality of circuit devices to a frequency band of predetermined width, comprising an oscillator; means for coupling the oscillator to each of the circuit devices in turn; means for controlling the oscillator to generate and impose upon each circuit device to which it is then connected a voltage varying in frequency through a predetermined band width; an oscilloscope having a display surface and deflecting electrodes; means for deriving from each circuit device a voltage wave indicative of the characteristic response to the impressed frequency, a single channel for applying said voltage wave to at least one control element of the oscilloscope; a timing circuit for controlling the connection of the oscillator to the circuit devices, and for controlling the application of a time base voltage to at least another control element of said oscilloscope; a color filter having a plurality of regions of different colors through which the display surface may be viewed; and means for selectively and synchronously disposing a different color before the display surface during the connection of each of the circuit devices to the oscilloscope.

5. A signal comparison system, comprising, a first source of signals having a plurality of frequencies, a second source of signals having a further plurality of frequencies, an oscilloscope having a visual display surface, means for generating a beam of electrons, a single detection channel for said first and second signals, means for periodically connecting said first and second sources of signals to said single detection channel in alteration, means for deflecting said beam of electrons in a first direction in response to signal output from said single detection channel, means for periodically deflecting said beam of electrons in a second direction to provide successive base lines on said visual display surface, during connection of each of said first and second sources to said single detection channel, a light filter having two differently colored portions and rotatable alternately to position said differently colored portions in viewing relation to said visual display surface, and means for rotating said two color light filter to position said differently colored portions alternately in viewing relation to said display surface in synchronism with alternate connection of said first and second sources of signals to said single detection channel.

6. A signal comparison system, comprising, a plurality of independent sources of signals, an oscilloscope having means for generating a cathode ray beam and a visual display surface and two sets of beam deflection means, a single detection channel for said plurality of independent sources of signals, means for connecting said plurality of independent sources of signals to said single detection channel in succession, means connected to one of said two sets of deflection means to provide successive base lines on said visual display surface, means responsive to signal output from said single detection channel connected to the remaining one of said two sets of deflecting means, a color filter screen having discrete portions of different color disposable in viewing relation to said visual display surface, and means for positioning successive ones of said discrete portions of said multi-color filter screen in said viewing relation during successive connection of said plurality of independent sources of signals to said single detection channel.

7. A signal comparison system comprising a plurality of independent sources of signals, a mixer, means for connecting said sources sequentially to said mixer, a local oscillator, means for scanning the frequency of said local oscillator, means for applying local oscillations from said local oscillator to said mixer for frequency conversion therein of said signals, a relatively narrow band amplifier for amplifying the products of said frequency conversion, means comprising a cathode ray tube having a viewing surface for displaying said products of conversion, a multicolor filter screen having a plurality of differently colored transparent portions positionable separately in viewing relation to the viewing surface of said cathode ray tube, means comprising a motor for rotating said screen to position successive ones of said plurality of differently colored transparent portions of said screen in viewing relation to said viewing surface in synchronism with connection by said first means of said sources sequentially to said mixer.

8. A signal comparison system for comparing the responses of a plurality of circuit devices to a frequency band of determined width comprising, an oscillator, means connected to said oscillator for sweeping the frequency of said oscillator, means for sequentially coupling said circuit devices to said oscillator each during one of said sweepings, a single channel for detecting the responses of said circuit devices to said oscillator, means comprising a cathode ray tube having a viewing surface for displaying said responses, a motor, a multi-color rotatable filter screen having discrete angular segments of different colors positionable in succession in viewing relation to the viewing surface during rotation of said filter screen, and means for rotating said filter screen to position successive ones of said discrete angular segments in viewing relation to said viewing surface in synchronism with said sequential coupling of said circuit devices to said oscillator.

9. A signal comparison system, comprising, a plurality of sources of signal, an oscilloscope having a visual display surface, means for generating a beam of electrons, a single detection channel for said plurality of signals, means for periodically connecting successive ones of said plurality of signals to said single detection channel, means for deflecting said beam of electrons in a first direction in response to signal output from said single detection channel, means for periodically deflecting said beam of electrons in a second direction to provide successive base lines on said visual display surface during connection of successive ones of said sources to said single detection channel, a light filter having two differently colored portions and rotatable alternately to position said differently colored portions in viewing relation to said visual display surface, and means for rotating said light filter to position said differently colored portions in said viewing relation successively in synchronism with connection of successive ones of said sources of signals to said single detection channel.

JOSEPH I. HELLER.

REFERENCES CITED

The following references are of record in the file of this patent:

UNITED STATES PATENTS

| Number | Name | Date |
|---|---|---|
| 1,853,953 | Becker | Apr. 12, 1932 |
| 2,252,058 | Bond | Aug. 12, 1941 |
| 2,313,978 | Toepfer | Mar. 16, 1943 |
| 2,331,190 | Hipple, Jr. | Oct. 5, 1943 |
| 2,378,746 | Beers | June 19, 1945 |